United States Patent
Hara et al.

(10) Patent No.: US 7,522,191 B2
(45) Date of Patent: Apr. 21, 2009

(54) OPTICAL IMAGE CAPTURING DEVICE

(75) Inventors: Minoru Hara, Hachioji (JP); Jun Shimizu, Naha (JP)

(73) Assignee: Olympus Imaging Corp., Tokyo (JP)

( * ) Notice: Subject to any disclaimer, the term of this patent is extended or adjusted under 35 U.S.C. 154(b) by 552 days.

(21) Appl. No.: 11/258,850

(22) Filed: Oct. 26, 2005

(65) Prior Publication Data

US 2006/0114335 A1    Jun. 1, 2006

(30) Foreign Application Priority Data

Nov. 26, 2004    (JP)    ............... 2004-343199

(51) Int. Cl.
  *H04N 9/73*    (2006.01)
  *H04N 5/235*   (2006.01)
  *H04N 9/083*   (2006.01)
  *H04N 7/18*    (2006.01)
(52) U.S. Cl. ............ 348/223.1; 348/362; 348/280; 348/81
(58) Field of Classification Search ........... 348/81, 348/223.1–228.1, 280, 362
See application file for complete search history.

(56) References Cited

U.S. PATENT DOCUMENTS

| 4,542,959 A | | 9/1985 | Kreutzig | |
|---|---|---|---|---|
| 5,438,363 A | * | 8/1995 | Ejima et al. | 348/223.1 |
| 5,530,474 A | * | 6/1996 | Takei | 348/224.1 |
| 5,794,076 A | * | 8/1998 | Farrington et al. | 396/25 |
| 6,267,051 B1 | * | 7/2001 | Feldman et al. | 101/171 |

FOREIGN PATENT DOCUMENTS

| JP | 06-351025 | 12/1994 |
|---|---|---|
| JP | 2000-244806 | 9/2000 |

OTHER PUBLICATIONS

Chinese Office Action for Chinese Patent Application No. 2005101237759, mailed on Jun. 27, 2008 (5 pgs.) (with English Translation (6 pgs.)).

* cited by examiner

*Primary Examiner*—Nhan T. Tran
*Assistant Examiner*—Trung Diep
(74) *Attorney, Agent, or Firm*—Straub and Pokotylo; John C. Pokotylo

(57) ABSTRACT

An optical image capturing device which is configured to carry out underwater photographing, and comprises a selecting section configured to select a plurality of photographing modes including an underwater photographing mode, an imaging member to obtain an object image, and an adjusting section to adjust white balance of an image obtained by the imaging member, is disclosed. The adjusting section adjusts the white balance to enhance a blue component when the underwater photographing mode is selected. Thus, as the white balance is adjusted by the adjusting section to enhance a blue component when the underwater photographing mode is selected, a bluish image apparently photographed in water can be obtained.

12 Claims, 5 Drawing Sheets

| COEFFICIENT | UNDERWATER WIDE | UNDERWATER MACRO |
|---|---|---|
| $\alpha S$ | 0.8 | 1 |
| $\beta S$ | 1 | 1 |
| $\gamma S$ | 1.2 | 1 |

Fig. 5

OPTICAL IMAGE CAPTURING DEVICE

CROSS-REFERENCE TO RELATED APPLICATION

This application is based upon and claims the benefit of priority from prior Japanese Patent Application No. 2004-343199, filed on Nov. 26, 2004, the entire contents of which are incorporated herein by reference.

BACKGROUND OF THE INVENTION

1. Field of the Invention

The present invention relates to an optical image capturing device such as a digital camera which has an underwater photographing mode, and more particularly to an optical image capturing device which can enhance a specific color component in an underwater photographing mode.

2. Description of the Related Art

Digital cameras, a digital video cameras (including those for news reporting and movies) and the like have been known as optical image capturing devices having an underwater photographing mode. In the underwater photographing to photograph an underwater object, a red component of light is absorbed more than other color components. Consequently, a photograph has coloring different from what a photographer has imagined. As a depth of water increases, and as a distance to the object becomes larger, a degree of the absorption becomes larger.

For example, Japanese Patent Application Laid-Open No. 6-351025 discloses an electronic still camera (a digital camera) which enhances a red color component by adjusting its white balance to become similar to that of the natural light when an object is in water, based on the water depth of the object, the distance to the object, and color balance around the digital camera when the object is in water.

BRIEF SUMMARY OF THE INVENTION

The present invention provides an optical image capturing device capable of carrying out underwater photographing, comprising a selecting section capable of selecting a plurality of photographing modes including an underwater photographing mode, an imaging member for capturing an object image, and an adjusting section for adjusting white balance of an image captured by the imaging member. The adjusting section adjusts the white balance to enhance a blue color component when the underwater photographing mode is selected.

As described above, the white balance is adjusted to enhance the blue component when the underwater photographing mode is selected. Since the enhanced image becomes bluish, it is apparent that the image is photographed in water.

In this case, the white balance can be adjusted by using a color temperature in fine weather as a reference. The adjusting section can adjust the white balance by multiplying each color component of the image by a predetermined coefficient.

For example, the coefficients satisfy the following equation when the underwater photographing mode is selected:

$$\gamma s \geq \beta s \geq \alpha s$$

wherein
- $\alpha s$: coefficient for a red color component R of the image
- $\beta s$: coefficient for a green color component G of the image
- $\gamma s$: coefficient for a blue color component B of the image.

According to the optical image capturing device of the present invention, when the underwater photographing mode is selected, a focal distance of a photographing lens, a program diagram of exposure control, an exposure correction value, AF and AE systems, a flash mode, and an ISO sensitivity can be set to be suitable for the underwater photographing.

For example, a predetermined amount of underexposure can be set when the underwater photographing mode is selected.

A digital camera can be cited as an example of the optical image capturing device of the present invention.

BRIEF DESCRIPTION OF THE SEVERAL VIEWS OF THE DRAWINGS

These and other features, aspects, and advantages of the apparatus and methods of the present invention will become better understood with regard to the following description, appended claims, and accompanying drawings where:

FIG. 5 is a table showing an example of coefficients $\alpha s$, $\beta s$, and $\gamma s$ in a table of a white balance control circuit.

DETAILED DESCRIPTION OF THE PREFERRED EMBODIMENT

Preferred embodiments of the invention are described below with reference to the accompanying drawings.

Figure 1:
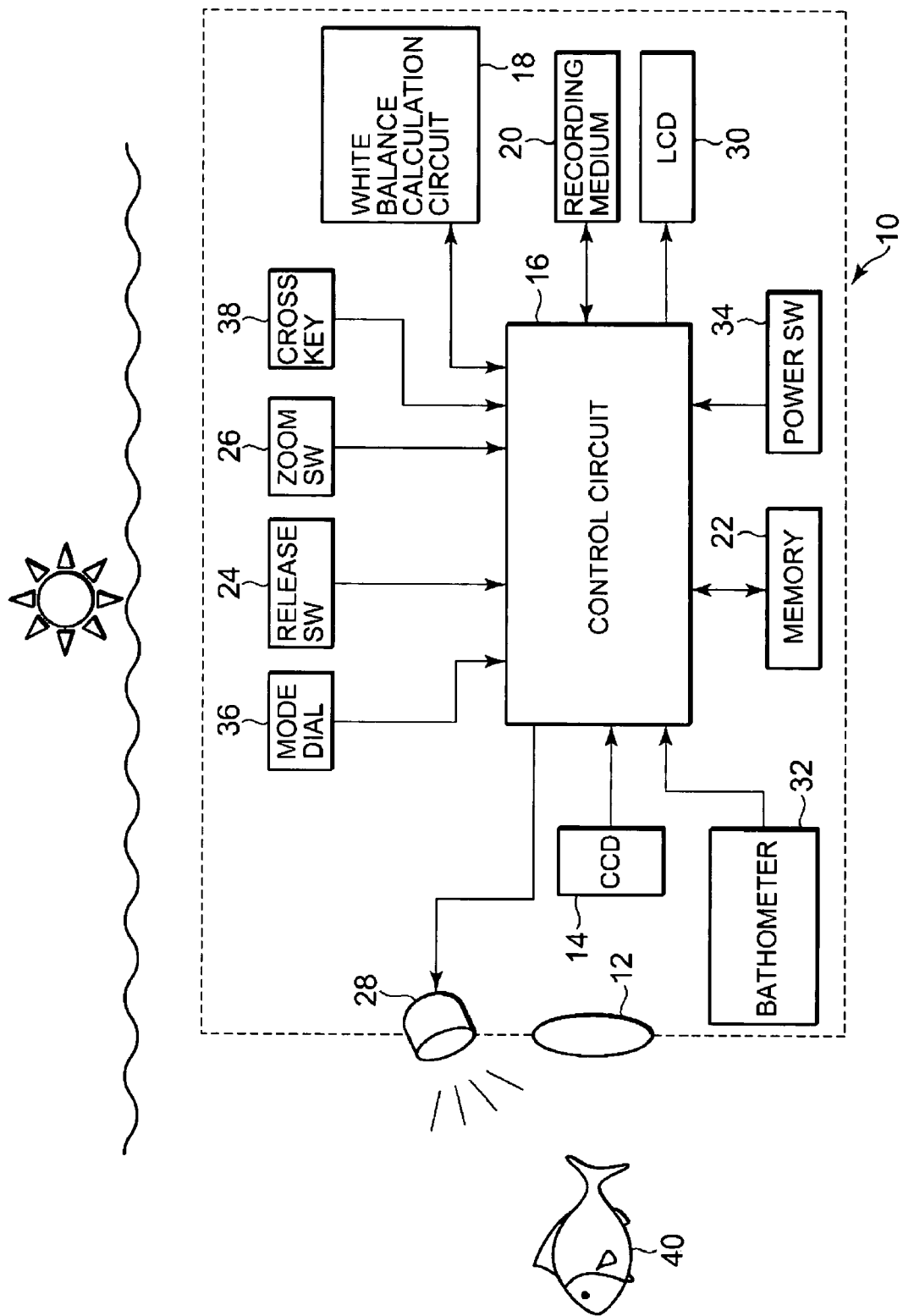
FIG. 1 is a schematic diagram of an optical image capturing device embodied as a digital camera.

FIG. 1 is a schematic diagram of an optical image capturing device embodied as a digital camera. As shown in FIG. 1, a digital camera 10 comprises a photographic lens 12 which includes a focus lens and a zoom lens driven by electric power, an imaging device (CCD) 14, a control circuit 16, and a white balance calculation circuit 18. The digital camera further includes a recording medium 20, a memory 22, a release switch (release SW) 24, a zoom switch (zoom SW) 26, a strobe 28, a liquid crystal display (LCD) 30, a bathometer 32, a power switch (power SW) 34, a mode dial (mode SW) 36, and a cross key (selection key) 38. It is to be noted that the digital camera 10 can be configured by covering a digital camera including an underwater photographing mode with a waterproof protector, therefore it is not limited to a dedicated underwater photographing device (an underwater camera).

An object 40 is imaged through the photographic lens 12 on the CCD 14, and image data of a photoelectric-converted analog signal is input to the control circuit 16. The control circuit 16 includes a CPU, and controls operations of the components of the digital camera. The image data from the CCD is subjected to A/D conversion to be displayed on the LCD 30. When the release SW 24 is pressed, the digital data of the LCD is captured by the control circuit 16 to be temporarily stored in the memory 22. Then, the digital image (image data) of the memory 22 is subjected to white balance calculation by the white balance calculation circuit 18, corrected in color, and written in the recording medium 20. When the amount of the environmental light is not enough, light is emitted from the strobe 28, and applied to the object 40 to photograph it. The bathometer 32 measures the depth of the digital camera 10 in water.

Figure 2A:
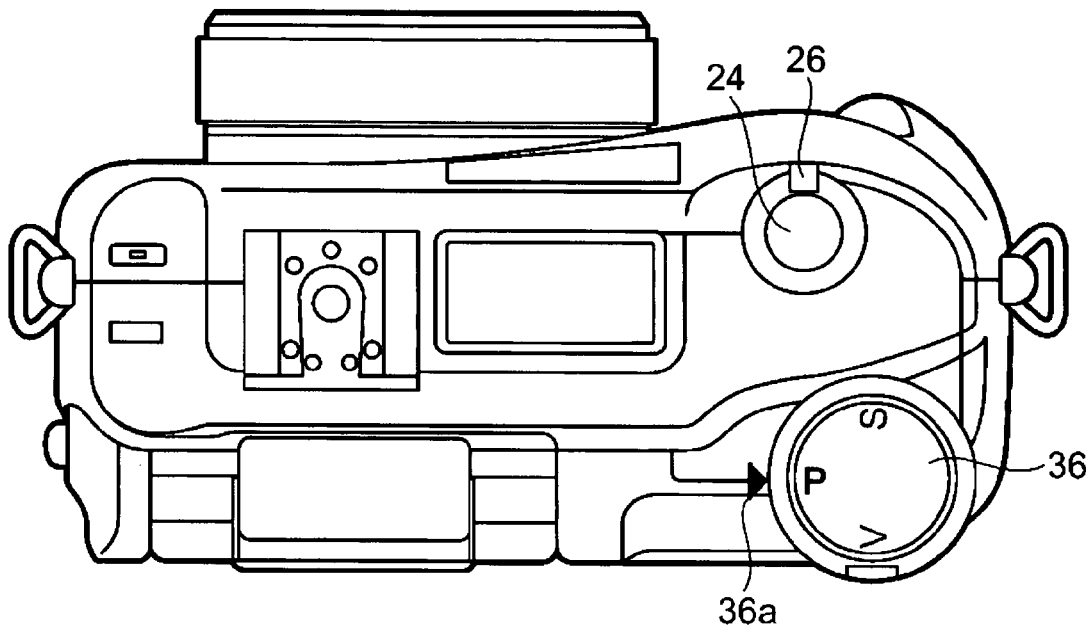
FIG. 2A is a plan diagram showing an appearance of the digital camera.
Figure 2B:
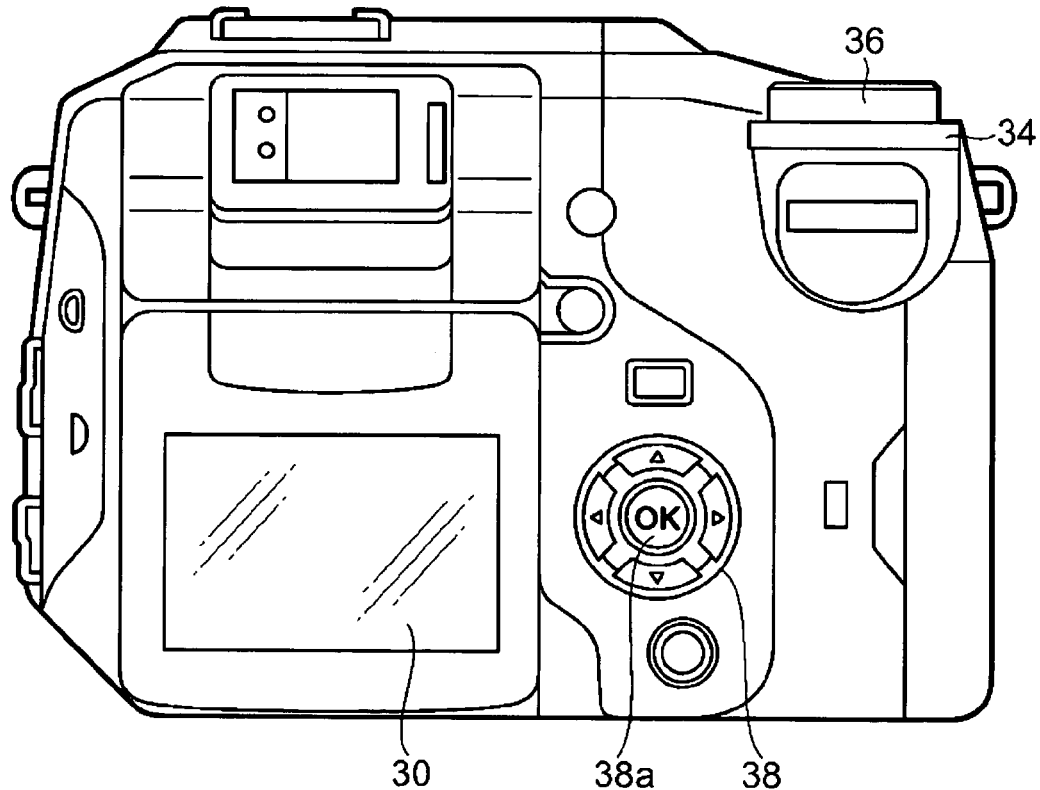
FIG. 2B is a backside diagram showing the appearance of the digital camera.

Each of FIGS. 2A and 2B shows an appearance of the digital camera 10: FIG. 2A is a plan diagram, and FIG. 2B is a backside diagram.

Operations of various switches (SW) will be briefly described by referring to FIGS. 2A and 2B. First, when a photographer operates the power SW 34, power is supplied to each circuit in the digital camera 10 to start the control circuit 16 and the other components. In this state, if a position of the mode dial 36 is set in a photographing mode, i.e., "P" imprinted in the mode dial 36 is set corresponding to a mode index 36a, photographing is enabled in a program auto-photographing mode. In this photographing mode, an aperture and a shutter speed are automatically adjusted, and photographing of proper exposure can be carried out only by pressing the release SW 24. In addition to the program auto-photographing mode, a scene mode and a view mode can be set by the mode dial 36.

When the photographer rotates the mode dial 36 so that "S" on the mode dial 36 corresponds to the mode index 36a, and operates the cross key 38 in this state, various scene modes such as a portrait mode, a landscape mode, a nightscape mode, a beach and snow mode, a party mode, an underwater wide mode, and an underwater macro mode are sequentially displayed on the LCD 30. Then, when the photographer presses an OK button 38a in a center of the cross key 38 in a state in which one of the scene modes is displayed on the LCD 30, this scene mode is set. Upon the setting of the scene mode, exposure conditions such as an aperture, a shutter speed, a zoom, and emission are automatically set by the control circuit 16.

When the photographer rotates the mode dial 36 so that "V" on the mode dial 36 corresponds to the mode index 36a, the view mode is set to display and view an image stored in the recording medium 20 on the LCD 30.

Furthermore, for example, unconditional light emission, exposure correction, image deletion, changing of an image quality mode, and the like can be set by the cross key 38. A focal distance of the photographic lens can be changed (zoomed up or down) by the zoom SW 26. The operations of various switches are disclosed only as examples, and operations thereof are not limited to these.

Figure 3A:
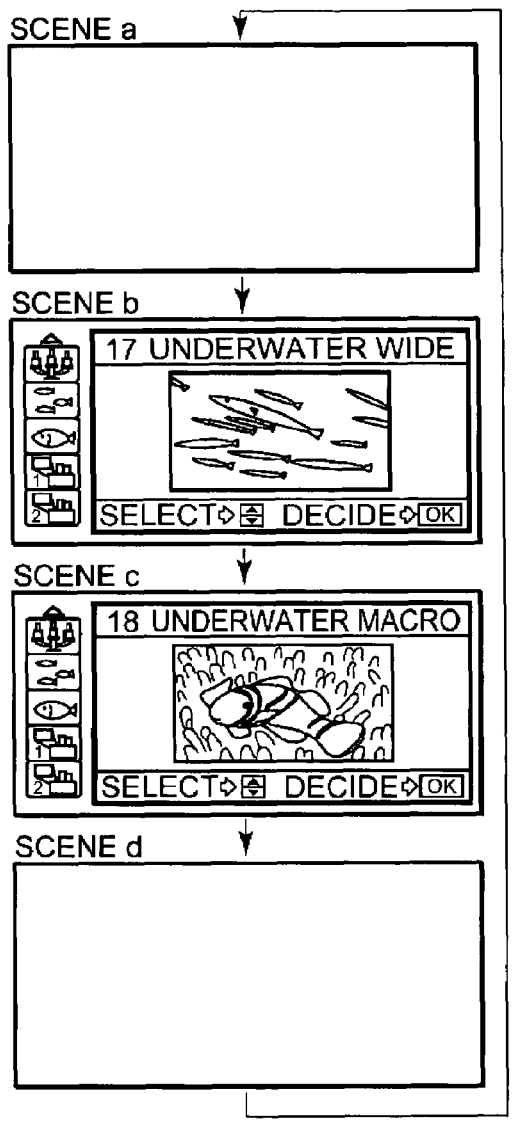
FIGS. 3A to 3C are diagrams showing LCD screens to select an underwater photographing mode and its conditions, FIG. 3A showing a screen before selection, FIG. 3B showing a screen after the selection, and FIG. 3C showing an example of various conditions in underwater wide and macro modes.
Figure 3B:
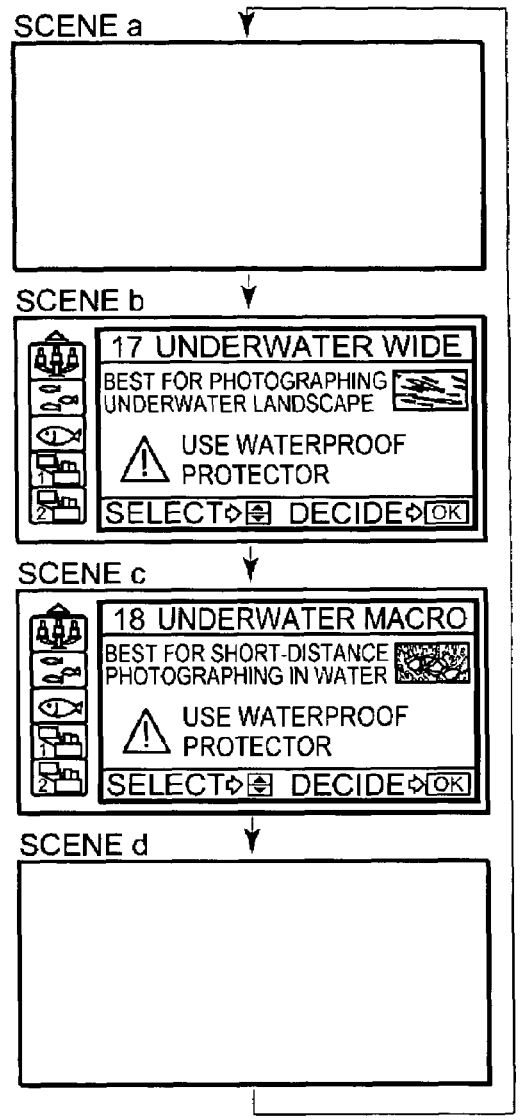

Each of FIGS. 3A to 3B shows a screen of the LCD 30 in which the photographer rotates the mode dial 36 to the scene mode position and operates the cross key 38 to select the underwater wide mode or the underwater macro mode for the underwater photographing. Specifically, FIG. 3A shows a screen before selection by the OK button 38a, and FIG. 3B shows a screen after the selection. According to the embodiment, the underwater wide and macro modes can be set as the underwater photographing modes. The underwater wide mode is for carrying out underwater photographing by setting a focal distance of the photographic lens to the wide (wide angle) side, and the underwater macro mode is for carrying out underwater photographing by setting a focal distance of the photographic lens to the tele (telescopic) side.

For simplification, it is presumed in FIGS. 3A and 3B that a plurality of scenes a to d are sequentially displayed on the LCD 30 by operating the cross key 38, and the scene b shows the underwater wide mode and the scene c shows the underwater macro mode.

Specifically, when the photographer rotates the mode dial 36 to the scene mode position and operates the cross key 38, as shown in FIG. 3A, the underwater wide mode and the underwater macro mode are visually displayed respectively in the scenes b and c. When the photographer presses the OK button 38a in the center of the cross key 38 in this state, as shown in FIG. 3B, explanations of the underwater wide or macro modes of the scenes b and c are respectively displayed on the LCD 30 for a certain time. After a passage of the certain time, a through-image (real time image captured with the CCD) is displayed in place of the explanations.

Figures 3C, 4:
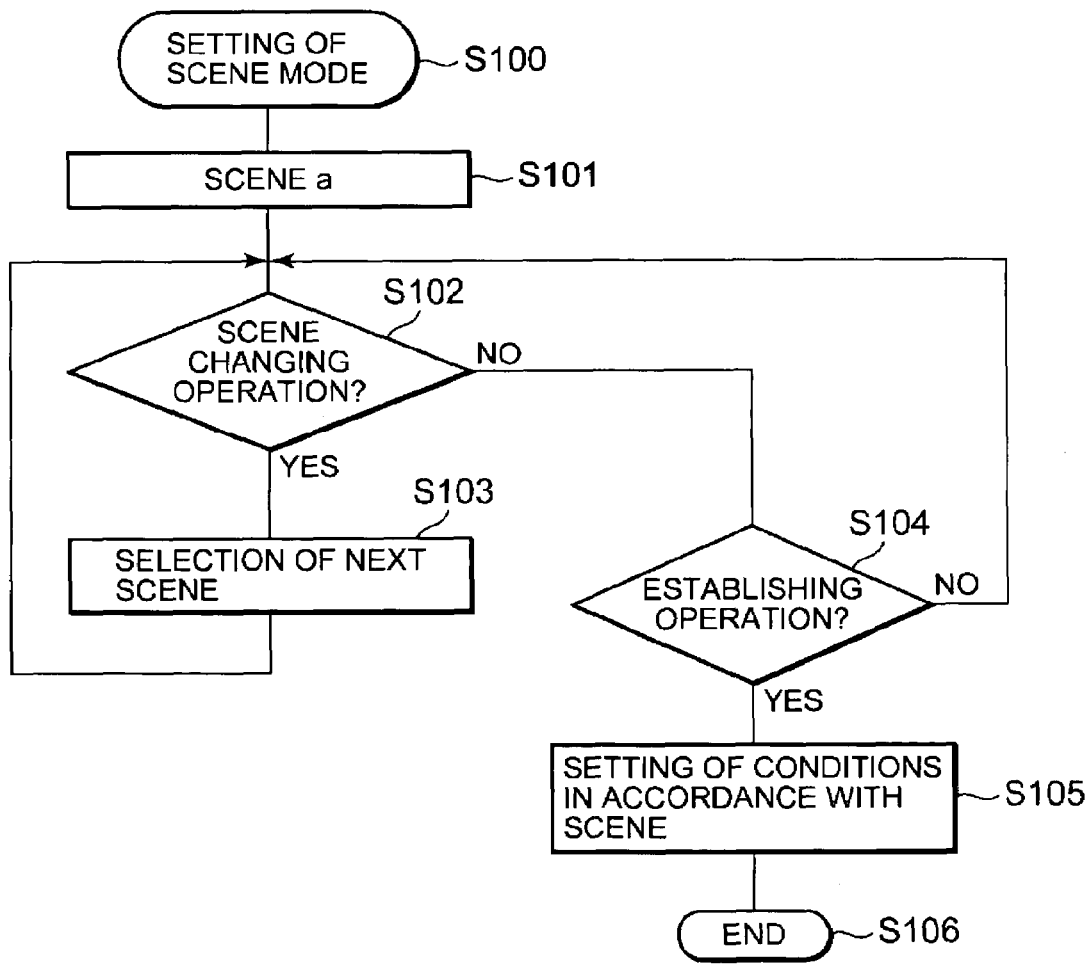
FIG. 4 is a flowchart of a scene mode.

In this case, exposure conditions such as an aperture, a shutter speed, a zoom, and light emission are automatically set by the control circuit 16 in accordance with a corresponding scene. FIG. 3C shows conditions set in the underwater wide and macro modes.

It is characteristic that white balance is set based on 5500K which is a color temperature of a sunlight (natural light) in fine weather. This will be described later in detail. To enhance a blue color of a photographed image more, an exposure amount during photographing is set to be under-value by one step. Needless to say, the under-value of the exposure amount does not need to be limited to one step, but a predetermined amount can be decided through experiments or the like.

FIG. 4 is a flowchart of the setting in the scene mode.

When the photographer rotates the mode dial 36 to switch it from the position of the program auto-photographing mode (P) to the position of the scene mode (S), a scene mode setting routine of FIG. 4 is started (S100).

In the scene mode setting, first, the scene a of FIG. 3A is displayed on the LCD 30 (S101). Then, the digital camera 10 waits until the photographer performs an operation of selecting another scene mode or makes the selection of this scene mode as an established decision (S102, and S103).

The scene a is a scene mode other than a mode for underwater photographing. When the photographer presses the cross key 38 to select the scene mode for underwater photographing, it is detected in S102, and the process proceeds to S103 to display a next scene b. This scene b is the underwater wide mode. In the case of photographing in this underwater wide mode, the OK button 38a of the cross key needs to be pressed. When the photographer operates the OK button 38a, it is detected in S104, and photographing conditions (see FIG. 3C) are automatically set corresponding to the underwater wide mode in S105. Subsequently, the scene mode setting is finished (S106).

In the case of photographing in a mode other than the underwater wide mode, e.g., a scene c (the underwater macro mode) or other scenes, the photographer may press the cross key 38 to change the scene in the state of the scene mode waiting for the operation of establishing a decision.

In the digital camera of the embodiment, an automatic white balance photographing and a manual white balance photographing can be set. In the case of the automatic white balance photographing, the color components are adjusted in a manner such that the light source of the photographing place is converted into the daytime sunlight, whereby an image of natural coloring can be obtained. In the case of the manual white balance photographing, the photographer selects and sets a photographing place or a photographing light source by the cross key 38 and the OK button 38a, whereby an image with the impression in accordance with a light source can be obtained. For example, regarding color temperatures, a color temperature of a sunlight (natural light) in fine weather (which becomes a reference for white balance) is set to be 5500K, a color temperature of a sunlight on a cloudy day 7500K, a color temperature of an incandescent lamp 3000K, and a color temperature of a fluorescent lamp 4000K.

Next, description will be made on the white balance adjustment when the automatic white balance photographing is carried out. When the photographer presses the release button SW 24, an image of the object imaged with the CCD 14 is first captured by the control circuit 16 in the memory 22. Next, the image data is read from the memory 22, and subjected to the white balance processing by the white balance calculation circuit 18 under control of the control circuit 16. That is, outputs of color components, red R, green G, and blue B are taken out of the image data read from the memory 22, a color distribution (distribution of B/G with respect to R/G) is calculated, and this color distribution is analyzed to estimate a type (color temperature) of a light source. The white balance control circuit 18 stores a table of coefficients (correction coefficients) with respect to various light sources (color temperatures). Based on the result of the light source estimation by the analysis of the color distribution, coefficients α, β, and γ of the red R, the green G, and the blue B are referred to and selected. Then, the outputs of the red R, the green G, and the blue B are multiplied by the coefficients α, β, and γ, whereby an image of natural coloring is obtained as a whole.

However the automatic white balancing functions during underwater photographing, an image of natural coloring under a natural light is obtained even in the underwater photographing. This may lose the characteristic impression of the underwater photographing. Therefore, according to the embodiment, in the underwater photographing mode (underwater wide mode), white balance is adjusted to enhance a blue component, thereby expressing a character of the underwater photographing. That is, when the underwater photographing mode is set, without causing the automatic white balancing to function, the coefficients αs, βs, and γs unique to the underwater photographing are automatically selected from the table of the white balance control circuit 18 to be used. The coefficients αs, βs, γs are set in a color balance which enhances the underwater photographing, i.e., bluish coloring by enhancing the blue component. Accordingly, when the outputs of the red R, the green G, and the blue B are multiplied with the coefficients αs, βs, γs, a blue color is enhanced as a whole, and an image having an atmosphere of photographed in water is obtained.

The coefficients αs, βs, and γs of the red R, the green G, and the blue B in the underwater photographing are obtained by using a color temperature (5500K) of a sunlight in water as a reference, the object 40 of a white color is imaged in a state in which a color temperature of a light source is set to 5500K, and calculation is executed so that light amount ratios of outputs $R_{5500}$, $G_{5500}$, and $B_{5500}$ of the red R, the green G, and the blue B can be equal to each other. In other words, the calculation is executed from the following equation (1). It is advised to execute the calculation with βs=1 so that the green component is used as a reference.

$$R_{5500}*αs : G_{5500}*βs : B_{5500}*γs = 1:1:1 \quad (1)$$

FIG. 5 shows an example of coefficients αs, βs, and γs in the table of the white balance control circuit 18. In the case of the underwater macro, since the object often occupies a large portion of the entire image while a water area is comparatively is small, coefficients smaller than those in the case of the underwater wide are set (γst<γsw). It is to be noted that γs≧1 and γs≧αs when βs=1.

The coefficient γs of the blue B can be changed corresponding to the varying photographing field angle when the zoom lens (photographic lens 12) is operated to change the photographing field angle. The coefficient γs of the blue B can be changed depending on a depth measured by the bathometer 32. By changing and calculating the coefficient γs depending on the photographing field angle or the depth, it is possible to carry out photographing in which an emphasis degree of the blue component is adjusted in accordance with the photographing field angle or the depth.

As described above, according to the present invention, in the underwater photographing mode, for example, the white balance is adjusted based on the (correction) coefficients unique to the underwater photographing by using 5500K of the sunlight (a natural light) in fine weather as a reference for a color temperature. As a result, a blue color is made conspicuous, whereby blue-enhanced photographing suitable for the underwater photographing can be carried out.

To briefly describe correspondence between the components of the embodiment, an adjusting section of Claim 1 corresponds to the control circuit 16 and the white balance calculation circuit 18, and a selecting section corresponds to the cross key 38 which includes the OK button. However, the components of the embodiment are only exemplary components of Claims, and the components of Claims are not limited to those of the embodiment.

While there has been shown and described what are considered to be preferred embodiments of the invention, it will, of course, be understood that various modifications and changes in form or detail could readily be made without departing from the spirit of the invention. It is therefore intended that the invention not be limited to the exact forms described and illustrated, but constructed to cover all modifications that may fall within the scope of the appended claims.

What is claimed is:

1. An optical image capturing device capable of carrying out underwater photographing, comprising:
    a selecting section for selecting a plurality of photographing modes including an underwater photographing mode;
    an imaging member for obtaining an object image; and
    an adjusting section for adjusting a white balance of an image obtained by the imaging member, the adjusting section adjusting the white balance to enhance a blue component when the underwater photographing mode is selected by multiplying each color component of the image by a predetermined coefficient when the underwater photographing mode is selected, wherein the predetermined coefficients satisfy the following equation when the underwater photographing mode is selected:

$$γs ≧ βs ≧ αs$$

wherein
    αs is one of the predetermined coefficients for a red color component R of the image,
    βs is one of the predetermined coefficients for a green color component G of the image, and
    γs is one of the predetermined coefficients for a blue color component B of the image.

2. The optical image capturing device according to claim 1, wherein the adjusting section adjusts the white balance based on a color temperature in fine weather when the underwater photographing mode is selected.

3. The optical image capturing device according to claim 1, wherein when the underwater photographing mode is selected, a focal distance of a photographic lens, a program diagram of exposure control, an exposure correction value, AF and AE systems, a flash mode, and an ISO sensitivity are set to be suitable for the underwater photographing.

4. The optical image capturing device according to claim 1, wherein an under-exposure state of a predetermined amount is set when the underwater photographing mode is selected.

5. The optical image capturing device according to claim 1, wherein the device is a digital camera.

6. An optical image capturing device having an underwater photographing mode, comprising:

a photographic lens;

an imaging device to capture an object image through the photographic lens; and a white balance adjustment circuit to adjust white balance of an output image of the imaging device, the white balance adjustment circuit multiplying each color component of the image by a predetermined coefficient to enhance a blue component of the image in the underwater photographing mode, and the predetermined coefficients satisfy the following equation in the underwater photographing mode:

$$\gamma s \geq \beta s \geq \alpha s$$

wherein $\alpha s$ is one of the predetermined coefficients for a red color component R of the image, $\beta s$ is one of the predetermined coefficients for a green color component G of the image, and $\gamma s$ is one of the predetermined coefficients for a blue color component B of the image.

7. The optical image capturing device according to claim 6, wherein the coefficients are set by using a color temperature in fine weather as a reference.

8. The optical image capturing device according to claim 6, wherein when the underwater photographing mode is selected, a focal distance of a photographic lens, a program diagram of exposure control, an exposure correction value, AF and AE systems, a flash mode, and an ISO sensitivity are set to be suitable for the underwater photographing.

9. The optical image capturing device according to claim 6, wherein an under-exposure state of a predetermined amount is set when the underwater photographing mode is selected.

10. The optical image capturing device according to claim 2, wherein the device is a digital camera.

11. The optical image capturing device according to claim 3, wherein the device is a digital camera.

12. The optical image capturing device according to claim 4, wherein the device is a digital camera.

* * * * *